(12) United States Patent
Khamitkar

(10) Patent No.: US 8,807,154 B2
(45) Date of Patent: *Aug. 19, 2014

(54) RUPTURE DISK

(71) Applicant: Oklahoma Safety Equipment Company, Inc., Broken Arrow, OK (US)

(72) Inventor: Sudheer Khamitkar, Tulsa, OK (US)

(73) Assignee: Oklahoma Safety Equipment Company, Inc., Broken Arrow, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,813

(22) Filed: Aug. 26, 2013

(65) Prior Publication Data
US 2014/0053916 A1 Feb. 27, 2014

Related U.S. Application Data

(63) Continuation of application No. 12/869,920, filed on Aug. 27, 2010, now Pat. No. 8,517,042.

(60) Provisional application No. 61/237,596, filed on Aug. 27, 2009.

(51) Int. Cl.
*F16K 17/40* (2006.01)
*F16K 17/16* (2006.01)
*H01M 2/12* (2006.01)
*H01M 10/052* (2010.01)
*H01M 2/10* (2006.01)

(52) U.S. Cl.
CPC .............. *F16K 17/1606* (2013.01); *Y02E 60/12* (2013.01); *H01M 10/052* (2013.01); *F16K 17/1613* (2013.01); *H01M 2/1241* (2013.01); *H01M 2/1072* (2013.01)
USPC ...................................... 137/68.29; 137/68.26

(58) Field of Classification Search
USPC .......... 137/68.11, 68.26, 68.28, 68.29, 68.18, 137/910; 429/256; 220/89.2, 89.3
See application file for complete search history.

(56) References Cited

U.S. PATENT DOCUMENTS

| | | |
|---|---|---|
| 4,067,154 A | 1/1978 | Fike |
| 4,207,913 A | 6/1980 | Fike, Jr. |
| 4,580,691 A | 4/1986 | Hansen |
| 4,612,739 A | 9/1986 | Wilson |
| 4,656,793 A | 4/1987 | Fons |
| 4,750,303 A | 6/1988 | Mullen |
| 4,787,180 A | 11/1988 | Robinson |

(Continued)

*Primary Examiner* — John Rivell
*Assistant Examiner* — Kevin Barss
(74) *Attorney, Agent, or Firm* — Garvey, Smith, Nehrbass & North, L.L.C.; Charles C. Garvey, Jr.; Vanessa M. D'Souza

(57) ABSTRACT

A rupture disk is provided for relieving pressure between the interior of a battery box and the exterior of the battery box, the box having an outlet opening. A first layer provides a gasket which abuts the battery box, the gasket having a central opening which aligns with the battery box opening. A second layer is in the form of a reverse buckling disk having a disk flange, a domed portion and a weakened portion on the dome that defines a disk burst pressure, the second layer having concave and convex sides. A third layer that is an outlet ring that sandwiches the second layer in between the first and the third layer layers, the outlet ring having a central opening surrounded by an edge. A plurality of teeth on the third layer extend from said edge inwardly. A plurality of tabs are provided on the first and third layers.

20 Claims, 3 Drawing Sheets

(56) References Cited

U.S. PATENT DOCUMENTS

| | | |
|---|---|---|
| 4,821,909 A | 4/1989 | Hibler |
| 5,036,632 A | 8/1991 | Short |
| 5,678,307 A | 10/1997 | Farwell |
| 6,070,365 A | 6/2000 | Leonard |
| 6,367,203 B1 | 4/2002 | Graham |
| 6,431,383 B1 | 8/2002 | Mozley et al. |
| 6,591,854 B1 | 7/2003 | Turner et al. |
| 6,607,003 B1 | 8/2003 | Wilson |
| 7,600,527 B2 | 10/2009 | Shaw |
| 8,517,042 B2 | 8/2013 | Khamitkar |
| 2007/0218356 A1 | 9/2007 | Kawamura et al. |
| 2008/0060702 A1 | 3/2008 | Muddiman |

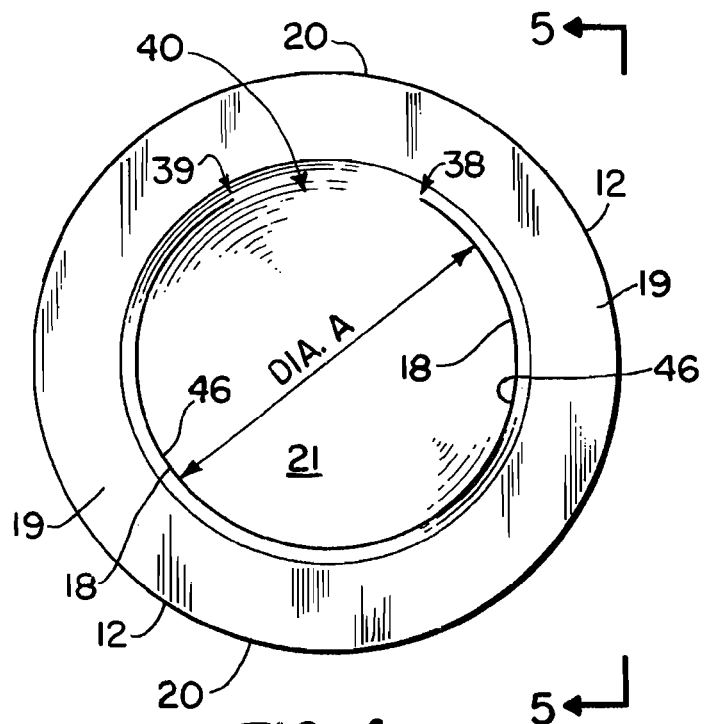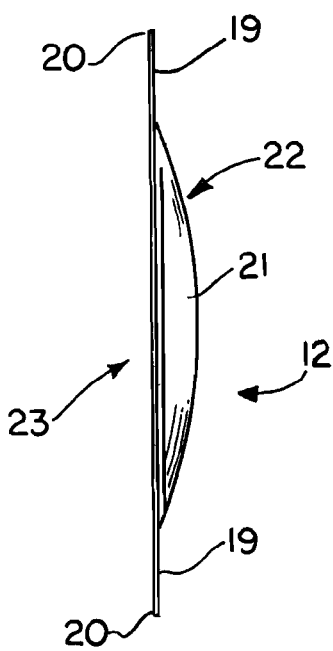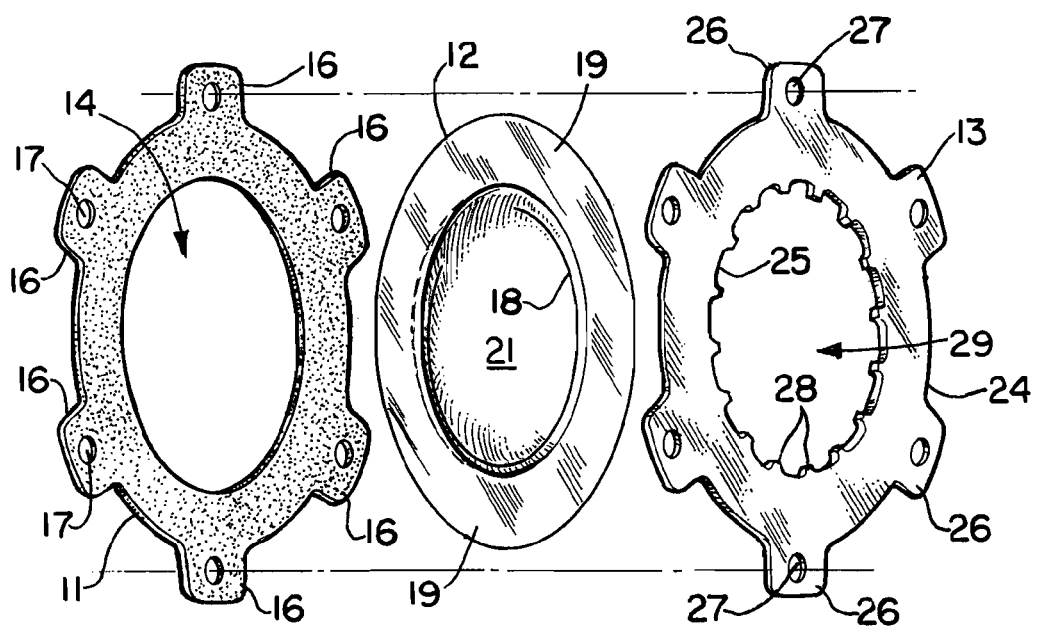

RUPTURE DISK

CROSS-REFERENCE TO RELATED APPLICATIONS

This is a continuation of U.S. patent application Ser. No. 12/869,920, filed Aug. 27, 2010 (issuing as U.S. Pat. No. 8,517,042 on Aug. 27, 2013), which is a nonprovisional of U.S. Provisional Patent Application Ser. No. 61/237,596, filed 27 Aug. 2009, both of which are hereby incorporated herein by reference.

Priority of U.S. patent application Ser. No. 12/869,920, filed Aug. 27, 2010 and U.S. Provisional Patent Application Ser. No. 61/237,597, filed 27 Aug. 2009, incorporated herein by reference, is hereby claimed.

International Application Serial No. PCT/US2011/049565, filed Aug. 29, 2011 (published as International Publication No. WO2012/027746 on Mar. 1, 2012), is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to rupture disks and panels, and more particularly to an improved rupture disk arrangement.

2. General Background of the Invention

Many patents (examples follow herein) have issued that relate to rupture disks and disks. Some of these patents relate to rupture disks that include a larger, often rectangular or square (or other) shaped disk member having a peripheral frame or border that supports it. An example of such a rupture disk can be seen in the Fike U.S. Pat. No. 4,067,154. The '154 patent discloses a flexible, low-mass, non-fragmenting burst member or disk which is said to be extremely predictable and essentially instantaneous in operation, even at low burst pressures, in order to safely vent and protect pressure vessels such as bag houses or the like from the potentially catastrophic effects of internal explosions or adverse high-pressure conditions. The disk structure preferably includes a thin metallic substrate having a pattern of tape directly applied thereto, with a coating of epoxy paint over the tape pattern and substrate; sharp-breaking, shear burst lines are thereby produced along the edges of the tape pattern which ensures that the disk will instantaneously vent a pressure vessel through essentially the entire area of full vent opening, thus giving a degree of operational predictability impossible to attain with conventional burst-type venting structures.

U.S. Pat. No. 4,612,739 discloses a low pressure venting disk that acts to safely vent a pressure vessel, such as a bag house, from overpressure conditions. The venting disk is said to be particularly responsive and predictable at low pressures. The disk includes a thin rupture body with a central group of apertures and slit lines emanating from the apertures. A thin sealing membrane is bonded to one surface of the rupture body at least in the area of the slits. The characteristics of the sealing membrane are said to enable the membrane to resist expansion in the area of the slits when pressure is applied to the rupture body, thereby resisting rupture of the membrane up to the design rupture limit of the venting disk. Various aperture patterns in the center of the rupture body are provided to facilitate predictable opening. The slits are divided into segments connected by bridges to help prevent the slits from separating and the sealing membrane from creeping through the slits prior to rupture. Protective strips adjacent the slits are positioned between the rupture body and the sealing membrane to reduce creep of the membrane through the slits prior to rupture. A vacuum support grid is provided for the disk to support the sealing membrane against a vacuum acting thereon opposite the rupture body.

In the Fons U.S. Pat. No. 4,656,793, a cover plate is retained in a rubber elastic sealing clamping section and is supported by at least one counter support constituted by a lever arm which will be swung from its supporting position when the load limit is exceeded.

A rupture disk in the form of a silo explosion door is disclosed in U.S. Pat. No. 4,750,303. The explosion door serves as a safety protection apparatus to prevent damage resulting from an explosion within a silo from inadvertently generated gaseous pressures.

The Robinson U.S. Pat. No. 4,787,180 provides a vibration resistant rupturable pressure relief member for protecting structure subject to vibration from reaching an overpressure condition. The rupturable pressure relief member is comprised of a rupture disk having an elongated concave-convex bulged portion formed therein and having a score pattern on a side thereof which includes an elongated score extending longitudinally across the bulged portion the ends of which connect with additional divergent scores forming opposing V-shapes.

In U.S. Pat. No. 4,821,909 there is provided a hygienic pressure relief disk unit which is said to reliably rupture at a predetermined pressure in order to prevent buildup of dangerous pressure within a protected structure such as a vessel or the like defining an enclosed space, which prevents media passage there through before rupture, and which is supposed to present a sanitary, easily cleanable surface toward the vessel interior in order to inhibit accumulation of food particles, dust or the like. The preferred disk unit includes a slotted stainless steel disk with the slots configured as a line of weakness for separation at a predetermined pressure, a sheet of PTFE material prepared on one side thereof to present an adhesive bonding surface, and an adhesive coupling the sheet and the disk, whereby the disk unit can be placed in a covering relationship with the vent opening of the protected structured in order to present the outer face of the PTFE sheet toward the vessel interior. The disk can include a series of slotted apertures defined there through configured to present a line of weakness, defining three sides of a rectangle. The line of weakness defines the predetermined amount of pressure at which the disk ruptures.

The Short U.S. Pat. No. 5,036,632 discloses a pressure relief disk assembly that includes a single rupture disk which includes a domed portion connected to a peripheral flat flange portion and has at least one slit formed therein defining a hinged blow-out part. The hinged blow-out part is connected to the remaining part of the rupture disk by an unslit hinge area and a plurality of rupture tabs.

A multiple dome single-disk explosion vent is disclosed in the Leonard U.S. Pat. No. 6,070,365. The explosion vent includes a peripheral flange configured for attachment to the enclosure around the opening, a pressure relief disk positioned within and hingedly connected to the flange, and a plurality of connectors or rupture tab assemblies connecting the unhinged portion of the pressure relief disk to the flange.

The connectors break when the enclosure is subjected to pressure build-up for permitting the disk to shift outwardly from the enclosure for uncovering the opening in the enclosure. Rivets are provided for attaching the rupture tab assemblies to the pressure relief disk which function to provide additional disk support and minimize localized bending of the rupture tabs forming a part of assemblies when the explosion vent is subjected to vacuum conditions, but do not interfere with rupture of the tabs and opening of the disk at a relatively low burst pressure. The pressure relief disk has a plurality of domed sections presenting at least one valley defining bridge there between. The domed sections and bridges cooperate to stiffen the disk so that it more uniformly distributes force on the connectors, causing all of the connectors to break at approximately the same time so that the disk more consistently opens at a selected burst pressure level.

U.S. Pat. No. 6,367,203 discloses a rupture disk that employs multiple layers including sealing members.

Lithium battery enclosures or battery boxes are often designed for automotive, industrial, and military applications. Many of such battery enclosures or battery boxes must be a sealed design. This necessitates the use of some pressure relief device to protect the enclosure or box against rapid pressure buildup experienced during a catastrophic upset, such as a battery short.

BRIEF SUMMARY OF THE INVENTION

The present invention provides a cost efficient and unique design for a rupture disk which is well suited for mass production requirements. The present invention provides a fast and easy installation. Only quick mounting threaded fasteners are required for installation. The design of the present invention is rugged, and will withstand full vacuum without any additional support.

The present invention provides a rupture disk for relieving pressure between the interior of a compartment such as a battery box and the exterior of the battery box, the box having an outlet opening.

A first layer provides a gasket which abuts the battery box, the gasket having a central opening which aligns with the battery box opening;

A second layer is in the form of a reverse buckling disk having a disk flange, a domed portion and a weakened portion (e.g., score) on the dome that provides a disk burst pressure, the second layer having concave and convex sides, with the height of the dome from the flat disk flange adjustable but accurately controlled.

A third layer is an outlet ring layer that sandwiches the second layer in between the first and the third layer layers. The outlet ring layer has a central opening surrounded by an inner edge. A plurality of teeth can be provided as part of the third layer, wherein the teeth extend inwardly from the inner edge of the third layer a distance. The teeth can be radially extending from the inner edge of the outlet ring layer.

A plurality of tabs are provided on the first and third layers, said tabs including circumferentially spaced apart tabs on each of said first and third layers, each tab having a tab opening, said tabs generally aligning so that a fastener can be passed through the tab openings of the first layer and the tab openings of the third layer;

A plurality of fasteners affix the first and third layers to the box. These fasteners can be simply threaded studs on the battery box which surround a battery box outlet opening. The apparatus is mounted to these studs, covering the outlet opening.

The apparatus is mounted such that the convex surface of the second layer which is the reverse buckling disk is towards the battery box outlet opening and the concave surface faces away from the outlet opening.

The second layer is generally circular and surrounded by the fasteners.

The teeth are positioned on the concave side of the second layer.

In one embodiment, the first layer is a gasket material layer.

In one embodiment, the first layer is a neoprene layer.

In one embodiment, the second layer is of a metallic material.

In one embodiment, the second layer has one or more scores that define at least in part the weakened portions.

In one embodiment, the second layer has a circular periphery.

In one embodiment, the fasteners do not pass through the second layer.

In one embodiment, the domed portion has a height of between about 0.3 and 0.4 inches.

In one embodiment, the second layer has a thickness of around 0.003-0.020 inches, for example 0.005 inches.

In one embodiment, the second layer has a diameter of between about 2 and 6 inches.

In one embodiment, the first and third layer each have the same number of tab openings.

In one embodiment, the second layer is metallic.

In one embodiment, the second layer is stainless steel.

In one embodiment, the third layer is metallic.

In one embodiment, the third layer is stainless steel

In one embodiment, the apparatus includes a battery box having an outlet opening, and the first, second and third layers are mounted to said battery box at the battery box outlet opening.

A rupture disk is provided for relieving pressure between the interior of a battery box and the exterior of the battery box, the box having an outlet opening. The apparatus includes a first layer that provides a gasket which abuts the battery box, the gasket having a central opening which aligns with the battery box opening. A second layer is in the form of a reverse buckling disk having a disk flange, a domed portion and a weakened portion on the dome that defines a disk burst pressure, the second layer having concave and convex sides. A third layer that is an outlet ring that sandwiches the second layer in between the first and the third layer layers, the outlet ring having a central opening surrounded by an edge. A plurality of teeth on the third layer extend from said edge inwardly a distance. A plurality of tabs are provided on the first and third layers, said tabs including circumferentially spaced apart tabs on each of said first and third layers, each tab having a tab opening, said tabs generally aligning so that a fastener can be passed through the tab openings of the first layer and the third layer. The third layer is attached to the second layer which is a metal disk by means of spot weld around the disk flange and the first layer attached to the metal disk by means of an adhesive thus forming a rupture disk assembly. The fasteners affix this rupture disk assembly to the box. The second layer is generally circular and surrounded by the fasteners. The teeth are positioned on the concave side of the second layer. In a preferred embodiment, the teeth do not extend so far inwardly that they extend inwardly beyond the weakened portion or score. From any radial line extending from the center of the layers, the weakened portion is reached before any tooth, the teeth thus being spaced radially a distance equal to or greater than the weakened portion or score.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 is a partial view of a preferred embodiment of the apparatus of the present invention;

FIG. 5 is a side view taken along lines 5-5 of FIG. 4;

FIG. 6 an exploded perspective view of a preferred embodiment of the apparatus of the present invention.

DETAILED DESCRIPTION OF THE INVENTION

Figure 7:
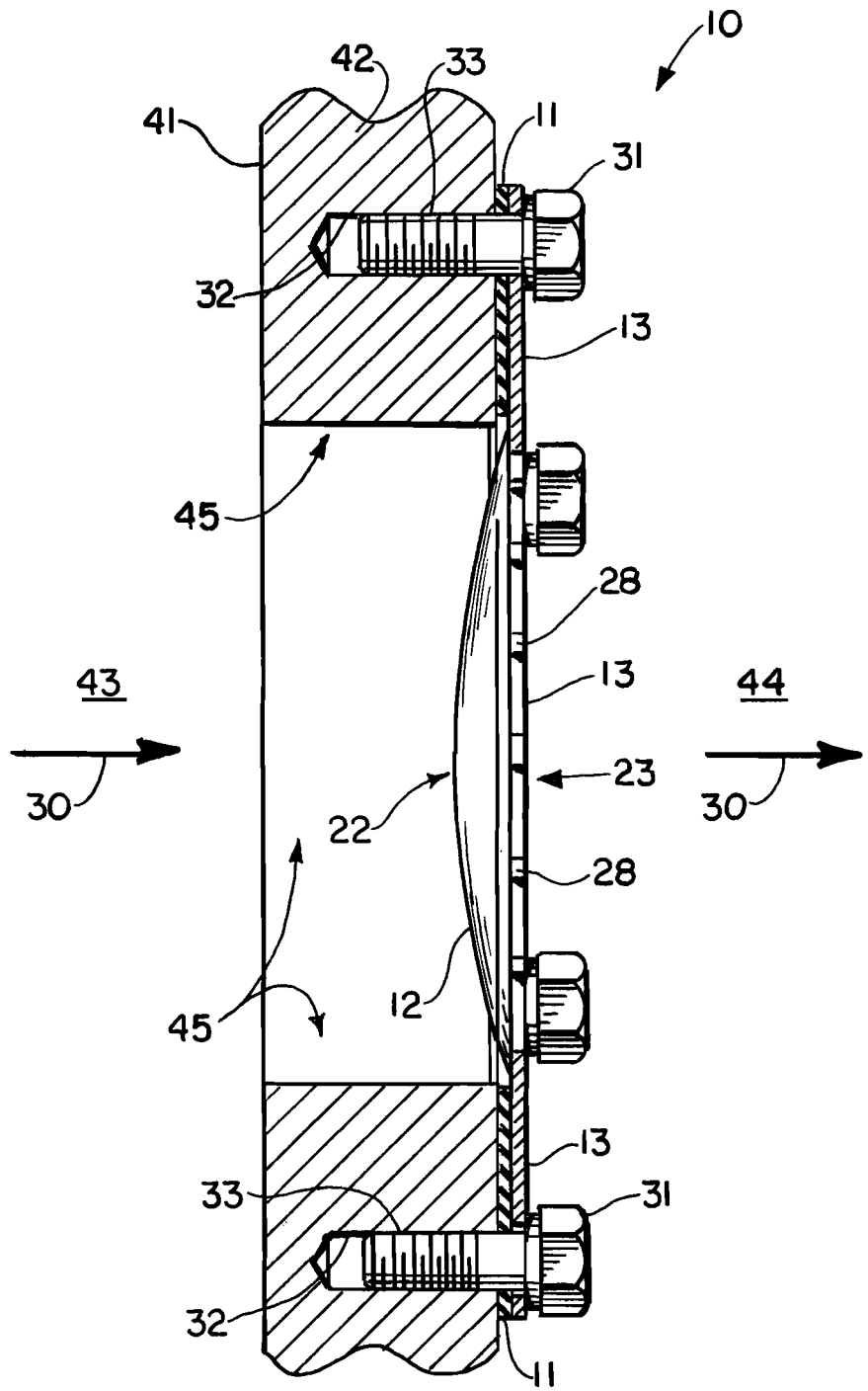
FIG. 7 is an side sectional view of a preferred embodiment of the apparatus of the present invention.

FIGS. 1-7 show a preferred embodiment of the apparatus of the present invention, designated generally by the numeral 10 in FIG. 7. Rupture disk apparatus 10 includes three pieces or layers 11, 12, 13. The piece or layer 11 is a lower layer that can be an adhesive backed foam seal layer. This piece or layer 11 can be a gasket material layer such as neoprene as an example.

The second piece or layer 12 is a metal membrane or metal disk. The piece or layer 12 can be a thin metal membrane with a weakened portion such as one or more scores or scoring 18 that determines the burst pressure of the apparatus. Layer 12 can be a stainless steel layer, such as 316 stainless steel.

The third piece or layer 13 is a hold down ring. This piece or layer 13 is attached to layer 12 which is a metal membrane by means of spot welds around the disk flange and layer 11 which a sealing material is attached to the metal disk by means of an adhesive thus forming a rupture disk assembly. This rupture disk assembly 10 is held in place with fasteners such as bolts, threaded studs or the like that enable attachment to a selected enclosure such as a battery box, selected item or the like. The battery box can be of the type that houses lithium batteries. An exemplary size for the battery box is forty (40) inches by forty (40) inches by six (6) inches. In FIG. 7, such a battery box 41 has an outlet opening 45 that is about the size and shape of the central opening 14 of layer 11. For example, openings 14 and 45 can be circular openings of about the same diameter.

Figure 1:
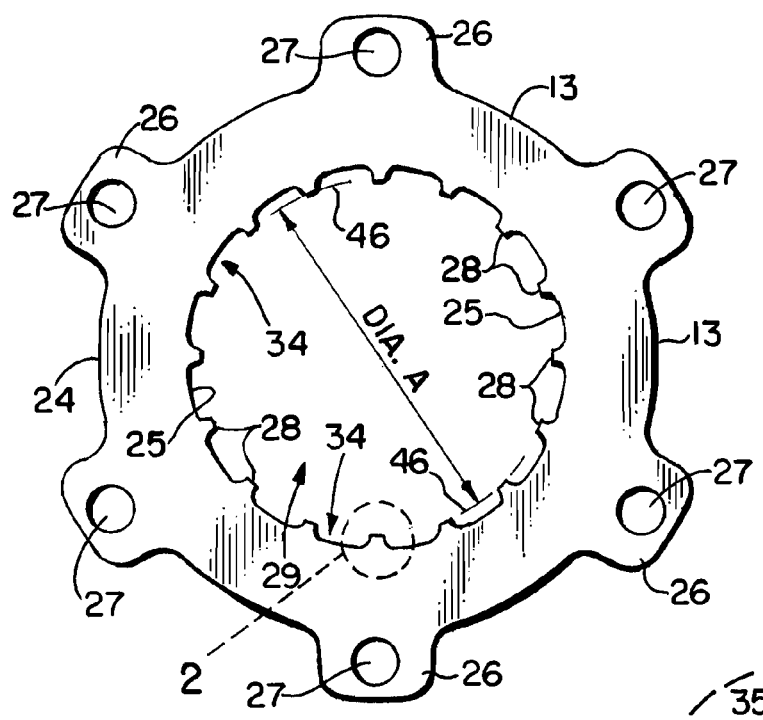
FIG. 1 is a partial view of a preferred embodiment of the apparatus of the present invention.
Figure 2:
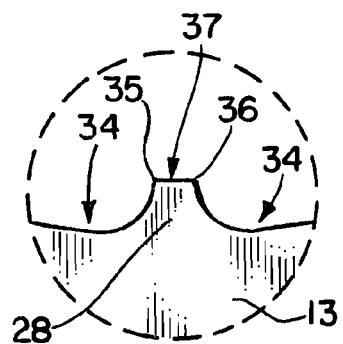
FIG. 2 is a fragmentary view of a preferred embodiment of the apparatus of the present invention.
Figure 3:
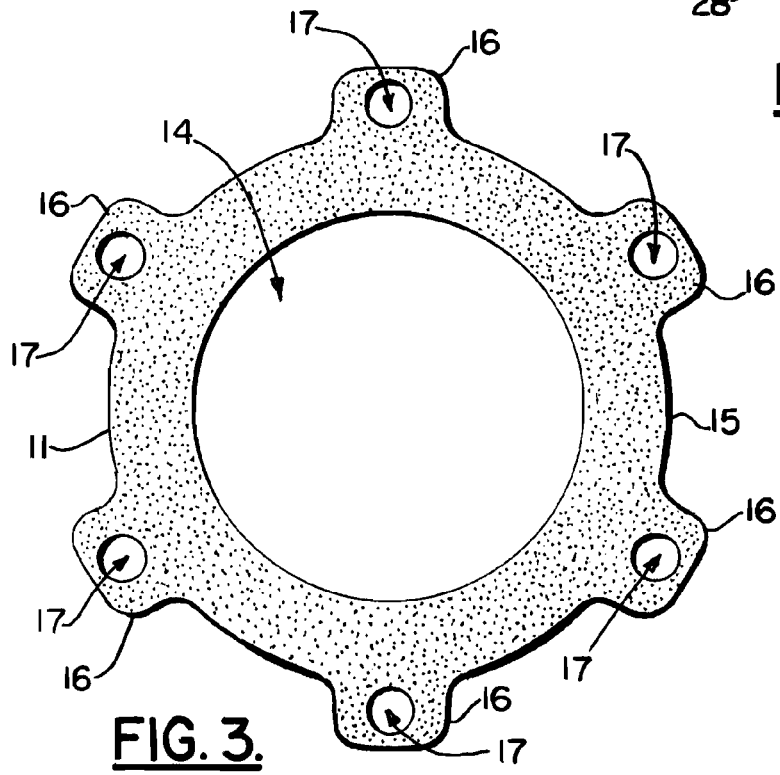
FIG. 3 is a partial view of a preferred embodiment of the apparatus of the present invention.

The layer 11 also has a peripheral edge 15. The edge 15 can be generally circular. A plurality of tabs 16 are attached to layer 11. Tabs 16 are radially extending from edge 15 as shown in FIG. 3. Tabs 16 are radially spaced, such as sixty (60) degrees apart so that there can be six (6) tabs 16. Each tab 16 has a tab opening 17.

Metal membrane layer or disk 12 has scoring or other weakened portion(s) such as a score 18 or a plurality of score(s) 18. In the drawings, score 18 can extend between score ends 38, 39. A hinge area 40 is that area generally in between the score ends 38, 39. Upon reversal of the disk or layer 12, the domed portion 21 breaks at score 18 and is held by hinge or hinge area 40 from flowing away from flange 19. The score 18 generally tracks a circular path as shown in FIG. 4.

The burst pressure value of the apparatus 10 can be determined by making the score(s) 18 deeper and by adjusting the dome 21 height of the second layer 12. By varying the depth of score(s) 18 and by accurately controlling the dome 21 height, a selected burst pressure value can be achieved.

Layer 12 has a peripheral flange 19 with an outer or peripheral edge 20. The layer or disk 12 has a central domed portion 21 with a convex side 22 which can be the upstream side and concave side 23 which can be the downstream side (see flow direction arrows 30, FIG. 7).

For a layer or disk 12 wherein the convex side 22 is the upstream side and the concave side 23 is the downstream side as seen in FIGS. 6-7, the layer or disk 12 can be a reverse buckling disk. In such a case, there are teeth 28 on the inner edge 25 of layer 13 that receive the outer periphery of the concave side 23 of the disk or layer when it reverses due to an over pressure situation. Each tooth 28 is spaced from the next tooth by a curved recess 34. Each tooth has an edge (e.g., circumferentially extending curved edge) 37 between points 35 and 36. Edge 37 can track score 18 as shown by dimension "A" of circular path 46 in FIGS. 1 and 4.

Outlet ring layer 13 has a central opening 29 that is preferably generally circular. Layer 13 has peripheral edge 24 and inner edge 25 which surrounds opening 29. Circumferentially spaced and radially extending teeth 28 can be provided on inner edge 25 (see FIGS. 1, 2, and 6).

As with layer 11, the layer 13 has tabs 26, each tab 26 having a tab opening 27. As with the layer 11, the tabs 26 are radially extending from an outer edge. Tabs 26 extend outwardly from edge 24. Tabs 26 are circumferentially spaced. In a preferred embodiment, each of the layers 11, 13 has six (6) tabs spaced circumferentially sixty (60) degrees apart. In this fashion, the tab openings 17, 27 can be aligned for receiving fasteners 31, such as bolts or threaded studs, mounted on battery box 41 wall 42 about the battery box outlet opening 45. Bolts 31 can be externally threaded to engage internally threaded openings 32 in battery box wall 42 at threaded connections 33 (see FIG. 7). Alternatively, the fasteners 31 can be studs having exposed threaded ends receptive of bolts or washers and bolts. Such studs could be partially imbedded in or mounted to wall 42. Arrow 30 shows a preferred flow direction through the apparatus 10 (see FIG. 7), from area 43 to area 44.

PARTS LIST

The following is a list of parts and materials suitable for use in the present invention:

| Parts Number | Description |
| --- | --- |
| 10 | rupture disk |
| 11 | gasket layer |
| 12 | disk layer |
| 13 | outlet ring layer |
| 14 | central opening |
| 15 | peripheral edge |
| 16 | tab |
| 17 | tab opening |
| 18 | score |
| 19 | flange |
| 20 | peripheral edge |
| 21 | domed portion |
| 22 | convex side |
| 23 | concave side |
| 24 | peripheral edge |
| 25 | inner edge |
| 26 | tab |
| 27 | tab opening |

-continued

| Parts Number | Description |
| --- | --- |
| 28 | teeth |
| 29 | central opening |
| 30 | arrow, flow direction |
| 31 | fastener |
| 32 | internally threaded opening |
| 33 | threaded connection |
| 34 | recess/curved recess |
| 35 | point |
| 36 | point |
| 37 | edge/curved edge |
| 38 | end of score |
| 39 | end of score |
| 40 | hinge area |
| 41 | battery box |
| 42 | wall |
| 43 | area |
| 44 | area |
| 45 | outlet opening |
| 46 | circular path |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A rupture disk for relieving pressure between the interior of a box and the exterior of the box, the box having an outlet opening, comprising:
    a) a first layer that provides a gasket which abuts the box, the gasket having a central opening which aligns with the box opening;
    b) a second layer in the form of a reverse buckling disk having a disk flange, a domed portion and a weakened score on the dome that defines a disk burst pressure, the second layer having concave and convex sides;
    c) a third layer that is an outlet ring that sandwiches the second layer in between the first and the third layer layers, the outlet ring having a central opening surrounded by an edge;
    d) a plurality of regularly spaced apart and circumferentially extending teeth on the third layer extending from said edge inwardly a distance, each tooth having a circumferentially extending edge;
    e) a plurality of recesses, one recess in between each pair of said teeth;
    f) the combination of teeth and recesses extending completely around said third layer central opening;
    g) a plurality of tabs on the first and third layers, said tabs including circumferentially spaced apart tabs on each of said first and third layers, each tab having a tab opening, said tabs generally aligning so that a fastener can be passed through the tab openings of the first layer and the third layer;
    h) fasteners that affix the first and third layers to the box;
    i) wherein the second layer is generally circular and surrounded by the fasteners; and
    j) wherein circumferentially extending edge of each tooth is positioned on the concave side of the second layer and next to the score.

2. The rupture disk of claim 1 wherein the second layer is of a metallic material.

3. The rupture disk of claim 1 wherein the score tracks a generally circular path.

4. The rupture disk of claim 1 wherein the fasteners do not pass through the second layer.

5. The rupture disk of claim 1 wherein the second layer has a diameter of between about 2 and 6 inches.

6. The rupture disk of claim 1 wherein the first and third layers each have the same number of tab openings.

7. The rupture disk of claim 1 wherein the second layer is metallic.

8. The rupture disk of claim 7 wherein the second layer is stainless steel.

9. The rupture disk of claim 1 wherein the third layer is metallic.

10. The rupture disk of claim 9 wherein the third layer is stainless steel.

11. The rupture disk of claim 1 further comprising a battery box and the first, second and third layers are mounted to said battery box.

12. A rupture disk for relieving pressure between the interior of a battery box and the exterior of the battery box, the box having an outlet opening, comprising:
    a) a first layer that provides a gasket which abuts the battery box, the gasket having a central opening which aligns with the battery box opening;
    b) a second layer in the form of a reverse buckling disk having a disk flange, a domed portion and one or more scores on the domed portion that define a disk burst pressure, the second layer having concave and convex sides;
    c) a third layer that is an outlet ring that sandwiches the second layer in between the first and the third layer layers, the outlet ring having a central opening surrounded by an edge;
    d) a plurality of teeth on the third layer, each tooth extending from said edge inwardly a distance, each tooth having an innermost tooth edge that is positioned adjacent said score and that extends circumferentially along a part of the score;
    e) a plurality of recesses, one recess in between each pair of teeth;
    f) the combination of teeth and recesses surrounding said third layer central opening;
    g) a plurality of tabs on the first layer, said tabs including circumferentially spaced apart tabs, each tab having a tab opening;
    h) a plurality of tabs on the third layer, said tabs including circumferentially spaced apart tabs, each tab having a tab opening;
    i) fasteners that affix the first and third layers to the box, the fasteners being arranged generally in a circle to provide a fastener circle;
    j) wherein the second layer domed portion is positioned inside of the fastener circle, surrounded by the fasteners; and
    k) wherein the teeth are positioned on the concave side of the second layer.

13. The rupture disk of claim 12 wherein the first layer is of a foam material.

14. The rupture disk of claim 12 wherein the first layer is of a neoprene material.

15. The rupture disk of claim 12 wherein the second layer is metallic.

16. The rupture disk of claim 12 wherein the second layer has one or more scores that define at least in part the weakened portions.

17. The rupture disk of claim 12 wherein the fasteners do not pass through the second layer.

18. The rupture disk of claim 12 wherein the second layer has a diameter of between about 2 and 6 inches.

19. The rupture disk of claim 12 wherein the first and third layer each have the same number of tab openings.

20. A rupture disk for relieving pressure between the interior of a battery box and the exterior of the battery box, the box having an outlet opening, comprising:
   a) a first layer that provides a gasket which abuts the battery box, the gasket having a central opening which aligns with the battery box opening;
   b) a second layer in the form of a reverse buckling disk having a disk flange, a domed portion and a weakened score on the dome that defines a disk burst pressure, the second layer having concave and convex sides, with the height of the dome from the disk flange adjustable but accurately controlled;
   c) a third layer that is an outlet ring that sandwiches the second layer in between the first and the third layer layers, the outlet ring having a central opening surrounded by an edge;
   d) a plurality of teeth on the third layer, each said tooth extending from said edge inwardly a distance, each tooth having a circumferentially extending edge;
   e) a recess between each pair of teeth;
   f) a plurality of tabs on the first and third layers, said tabs including circumferentially spaced apart tabs on each of said first and third layers, each tab having a tab opening, said tabs generally aligning so that a fastener can be passed through the tab openings of the first layer and the second layer;
   g) the third layer is attached to the second layer which is a metal membrane by means of spot welds around the disk flange and the first layer attached to the metal disk by means of an adhesive thus forming a rupture disk assembly;
   h) wherein the second layer is generally circular and surrounded by the fasteners;
   i) wherein circumferentially extending edge of each tooth is positioned on the concave side of the second layer and next to the score;
   j) fasteners that pass through the tab openings of the first and third layers and affix the rupture disk assembly to the box and
   k) wherein the combination of teeth and recesses extend three hundred sixty degrees around said third layer outlet ring cental opening.

* * * * *